United States Patent
Mrak et al.

(10) Patent No.: US 10,298,943 B2
(45) Date of Patent: May 21, 2019

(54) COMPRESSION OF PICTURES

(75) Inventors: Marta Mrak, London (GB); Thomas Davies, Surrey (GB); David John Flynn, Kitchener (CA); Andrea Gabriellini, London (GB)

(73) Assignee: BRITISH BROADCASTING CORPORATION, London (GB)

( * ) Notice: Subject to any disclaimer, the term of this patent is extended or adjusted under 35 U.S.C. 154(b) by 1102 days.

(21) Appl. No.: 13/996,426

(22) PCT Filed: Dec. 23, 2011

(86) PCT No.: PCT/GB2011/052589
§ 371 (c)(1),
(2), (4) Date: Sep. 9, 2013

(87) PCT Pub. No.: WO2012/085601
PCT Pub. Date: Jun. 28, 2012

(65) Prior Publication Data
US 2013/0343457 A1 Dec. 26, 2013

(30) Foreign Application Priority Data
Dec. 23, 2010 (GB) .................................... 1021924.4

(51) Int. Cl.
*H04N 19/436* (2014.01)
*H04N 19/593* (2014.01)
(Continued)

(52) U.S. Cl.
CPC ........... *H04N 19/436* (2014.11); *H04N 19/11* (2014.11); *H04N 19/176* (2014.11);
(Continued)

(58) Field of Classification Search
None
See application file for complete search history.

(56) References Cited

U.S. PATENT DOCUMENTS

2005/0025249 A1* 2/2005 Zhao .................... H04N 19/124
375/240.24
2006/0126730 A1 6/2006 Arakawa et al.
(Continued)

FOREIGN PATENT DOCUMENTS

| CN | 1770864 A | 5/2006 |
|----|-----------|--------|
| EP | 1761064 A2 | 3/2007 |

(Continued)

OTHER PUBLICATIONS

Munteanu A et al: "Applying Open-Loop Coding in Predictive Coding Systems", Oct. 20, 2008, Advanced Concepts for Intelligent Vision Systems; [Lecture Notes in Computer Science], Springer Berlin Heidelberg, Berlin, Heidelberg, pp. 25-37.

(Continued)

*Primary Examiner* — Michael J Hess
(74) *Attorney, Agent, or Firm* — Michael Best & Friedrich LLP

(57) ABSTRACT

In video coding, where differences between input picture values and picture prediction values are transformed in a block based transform, the differences are formed in a series of parallel steps. A first step conducted in parallel upon a first subset of pixels uses prediction values based wholly on previously processed blocks. This first subset can include anchor pixels which are not contiguous with any previously processed block. A second step conducted in parallel upon a second subset includes pixels which are predicted from pixels of the first subset.

30 Claims, 10 Drawing Sheets

(51) Int. Cl.
*H04N 19/182* (2014.01)
*H04N 19/50* (2014.01)
*H04N 19/503* (2014.01)
*H04N 19/176* (2014.01)
*H04N 19/61* (2014.01)
*H04N 19/11* (2014.01)

(52) U.S. Cl.
CPC ........... *H04N 19/182* (2014.11); *H04N 19/50* (2014.11); *H04N 19/503* (2014.11); *H04N 19/593* (2014.11); *H04N 19/61* (2014.11)

(56) References Cited

U.S. PATENT DOCUMENTS

| | | | |
|---|---|---|---|
| 2006/0222066 A1 | 10/2006 | Yoo et al. | |
| 2007/0053433 A1 | 3/2007 | Song | |
| 2007/0098070 A1 | 5/2007 | Saigo et al. | |
| 2007/0206872 A1 | 9/2007 | Song | |
| 2007/0274398 A1 | 11/2007 | Caulk | |
| 2008/0043833 A1* | 2/2008 | Perera | H04N 21/2343 375/240 |
| 2009/0232207 A1 | 9/2009 | Chen | |
| 2011/0026845 A1 | 2/2011 | Jung et al. | |
| 2011/0033127 A1* | 2/2011 | Rasmusson | G06T 9/00 382/238 |
| 2011/0116723 A1* | 5/2011 | Rasmusson | G06T 9/004 382/238 |
| 2011/0249731 A1* | 10/2011 | Zhao | H04N 19/50 375/240.12 |
| 2011/0249732 A1* | 10/2011 | Segall | H04N 19/152 375/240.12 |
| 2012/0014451 A1* | 1/2012 | Lee | H04N 19/436 375/240.16 |
| 2012/0106640 A1* | 5/2012 | Shen | H04N 19/11 375/240.16 |
| 2012/0183070 A1* | 7/2012 | Pateux | H04N 19/52 375/240.16 |
| 2012/0281028 A1* | 11/2012 | Orlick | G09G 3/3426 345/690 |

FOREIGN PATENT DOCUMENTS

| | | |
|---|---|---|
| EP | 1968323 A2 | 9/2008 |
| WO | 2008/004940 | 1/2008 |
| WO | 2009136066 A1 | 11/2009 |
| WO | 2011/004027 | 1/2011 |
| WO | 2011/018965 | 2/2011 |

OTHER PUBLICATIONS

Wiegand T et al: "Overview of the H.264/AVC video coding standard", IEEE Transactions on Circuites and Systems for Video Technology, IEEE Service Center, Piscataway, NJ, US, vol. 13, No. 7, Jul. 1, 2003, pp. 560-576.
UK Search Report, received in GB1021924.4, dated May 4, 2011 (5 pages).
Jie Zhao and Andrew Segall, "Parallel Prediction Unit for Parallel Intra Coding", Joint Collaborative Tem on Video Coding (JCT-VC) of ITU-T SG16 WP3 and ISO/IEC JTC1/SC29/WG11 2nd Meeting: Geneva, CH, Jul. 21-28, 2010 [JCTV-B112].
Notice of Reasons for Rejection received in Japanese Patent Application No. 2013-545511, dated Aug. 19, 2014, with English translation (12 pages).
Office Action from the European Patent Office for Application No. 11805926.0 dated Mar. 17, 2016 (8 pages).
Office Action from the Intellectual Property Office of the People's Republic of China for Application No. 201180066832.8 dated Feb. 14, 2016 (13 pages).
Search Report from the Intellectual Property Office of Great Britain for Application No. GB1021924.4 reported on May 3, 2017 (7 pages).

* cited by examiner

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

| 0 | 1 | 2 | 3 | 4 | 5 | 6 | 7 |
|---|---|---|---|---|---|---|---|
| 1 | 2 | 3 | 4 | 5 | 6 | 7 | 8 |
| 2 | 3 | 4 | 5 | 6 | 7 | 8 | 9 |
| 3 | 4 | 5 | 6 | 7 | 8 | 9 | 10 |
| 4 | 5 | 6 | 7 | 8 | 9 | 10 | 11 |
| 5 | 6 | 7 | 8 | 9 | 10 | 11 | 12 |
| 6 | 7 | 8 | 9 | 10 | 11 | 12 | 13 |
| 7 | 8 | 9 | 10 | 11 | 12 | 13 | 14 |

COMPRESSION OF PICTURES

This invention relates to compression coding of pictures and especially to the coding of pictures in video sequences. The term picture is used here to include fields and frames.

An early idea in the compression of pictures, known as Differential Pulse Code Modulation (DPCM), was to transmit not a pixel value but the difference between that pixel value and a predicted value for that pixel. This differential approach can exploit spatial redundancy in a picture and can exploit both spatial and temporal redundancies in a video sequence of pictures.

As video compression techniques developed towards the well known MPEG compression schemes, attention focussed on the use of differential techniques in the temporal domain. With accurate motion measurement techniques defining motion vectors between blocks in successive pictures, inter-picture differences can be very small and coded highly efficiently. To exploit spatial redundancy, spatial transform techniques were preferred, and applied both to motion-predicted (inter-coded) and unpredicted (intra-coded) areas of the picture.

A well recognised video encoder thus included motion compensated prediction, DCT or other spatial transform, quantisation and variable length or other entropy coding.

Efforts have continued in MPEG and in other coding regimes to increase coding efficiency and to extend coding capability to HDTV and still higher picture resolutions. Reference is directed to WO 2011/004027 which is hereby incorporated by reference.

One technique included in MPEG-4 Part 10/AVC/H.264 is to supplement the spatial transform with intra-picture prediction. In the decoder, data from blocks which have already been decoded and reconstructed can be used to provide a spatial prediction for the current block. In the encoder, this intra-prediction is of course made available through the local decoder.

This additional spatial prediction has been found to increase performance significantly, particularly for edge detail and for strongly directional texture, such as diagonal stripes.

Experiments have however shown that the increase in performance is greatest at small block sizes and that performance declines as block sizes increase. This is a problem first because transform coding gain is relatively poor for small block sizes and efficient transform coding demands large block sizes. Second, moves to higher definitions will necessarily involve still higher block sizes. To give some examples, intra-predictions have been found to work well with 4×4 and 8×8 block sizes. Moving to larger blocks might give greater transform coding gain, but spatial prediction becomes more complex and less effective. At HD resolutions and above, 16×16 blocks or larger transforms will be needed, (perhaps up to 64×64 for UHDTV).

A similar tension exists in motion-compensated prediction: larger block sizes require that fewer motion vectors are encoded, and allows the use of larger transforms on the residual. However, it increases the likelihood that some part of the large block will be poorly predicted, perhaps because of the motion of some small object or part of an object within the block area.

The present invention addresses this tension between the small block size required for effective prediction and the large block size required (especially at increased definition) for effective transform coding gain. The present invention also addresses the issue of efficient processing of prediction techniques.

Accordingly, the present invention consists in one aspect in a video compression encoder comprising:
a block splitter receiving picture information and splitting the picture information into spatial blocks of picture elements;
a predictor providing prediction values for the block;
a subtractor receiving picture information and prediction values and forming difference values;
a block transform conducting a transform on the block prediction values to provide transform coefficients;
wherein the predictor operates in parallel upon the picture elements of a subset of picture elements in the block, there being at least two subsets of picture elements in the block.

Advantageously, a first subset of picture elements comprises those picture elements which are predicted wholly from previously coded and reconstructed blocks.

Suitably, the first subset of picture elements comprises at least one picture element which is not contiguous with any previously processed block.

The location or value of such a picture element which is not contiguous with any previously processed block may be transmitted separately in the stream from transform coefficients or otherwise signalled to a decoder.

Preferably, a second subset of picture elements comprises picture elements which are predicted at least in part from picture elements of the first subset, which prediction may be a directional predictor or a motion-compensated predictor.

The predictor may operate sequentially on a series of subsets $S_i$ and in parallel upon the picture elements of each subset, the prediction for picture elements in subset $S_i$ depending at least in part upon the picture elements in preceding subsets $S_0, \ldots, S_{i-1}$.

The predictor may comprises an open loop predictor generating predictions based at least partly on picture elements in the current block and a closed loop predictor generating predictions based only on picture element information from a local decoder and the prediction values may comprise a weighted sum of the open loop prediction values and the closed loop prediction values.

Preferably, the closed loop predictor generates predictions for a first subset of picture elements based on picture element information from a local decoder; and generates predictions for a second subset of picture elements and optionally subsequent subsets of picture elements based at least partly on picture elements in the current block.

Where the closed loop predictor has a selectable direction, the open loop predictor may be selected in accordance with the selected direction of the closed loop predictor. The prediction strategy may be constant within a subset and may vary from one subset to another.

In another aspect, the present invention consist in a method of compression coding, comprising the steps of forming a difference between input picture values and picture prediction values; and transforming the difference in a block based transform; wherein the step of forming differences for a block comprises a first step conducted in parallel upon a first subset of picture elements in the block; a second step conducted in parallel upon a second subset of picture elements in the block and optional further steps.

Advantageously, the first step uses picture prediction values based wholly on previously processed blocks.

Suitably, the first subset of picture elements comprises at least one picture element which is not contiguous with any previously processed block.

Preferably, a second subset of picture elements comprises picture elements which are predicted at least in part from picture elements of the first subset.

Suitably, the step of forming differences for a block comprises a series of steps conducted sequentially on a series of respective subsets $S_i$, and in parallel upon the picture elements of each subset, the prediction values for picture elements in subset $S_i$ depending at least in part upon the picture elements in preceding subsets $S_0, \ldots, S_{i-1}$.

Suitably, the first step uses a first predictor for those picture elements which are contiguous with previously processed blocks and a second predictor on at least one picture element which is not contiguous with previously processed blocks.

The first and second subsets may take a chess board configuration, may comprise respective rows and may comprise respective columns.

Each step may be conducted using SIMD, MMX or other intrinsic parallel operations available within a CPU processor.

In still a further aspect, the present invention consists in a video compression decoder comprising:

an input receiving a compression encoded bitstream representing transformed picture differences organised in blocks;

an inverse quantisation unit providing re-scaled transform coefficients;

an inverse block transform conducting an inverse spatial transform on the transform coefficients to provide decoded picture difference values; and a predictor operating on the decoded picture values to provide prediction values for summation with said picture differences, wherein the predictor operates in parallel upon the picture elements of a subset of picture In yet a further aspect, the present invention consists method of compression coding, comprising the steps of forming a difference between input picture values and picture prediction values; and transforming the difference in a block based transform; wherein, at a block located at a border of the image or of a slice within the image such that an insufficient number or no previously processed blocks of the image are available for use in forming prediction values for that block, picture prediction values for at least some of the picture values in that block are based on other picture values in that block.

The invention will now be described by way of example with reference to the accompanying drawings, in which:

FIGS. 3 to 14 are diagrams illustrating techniques of the present invention:

Figure 1:
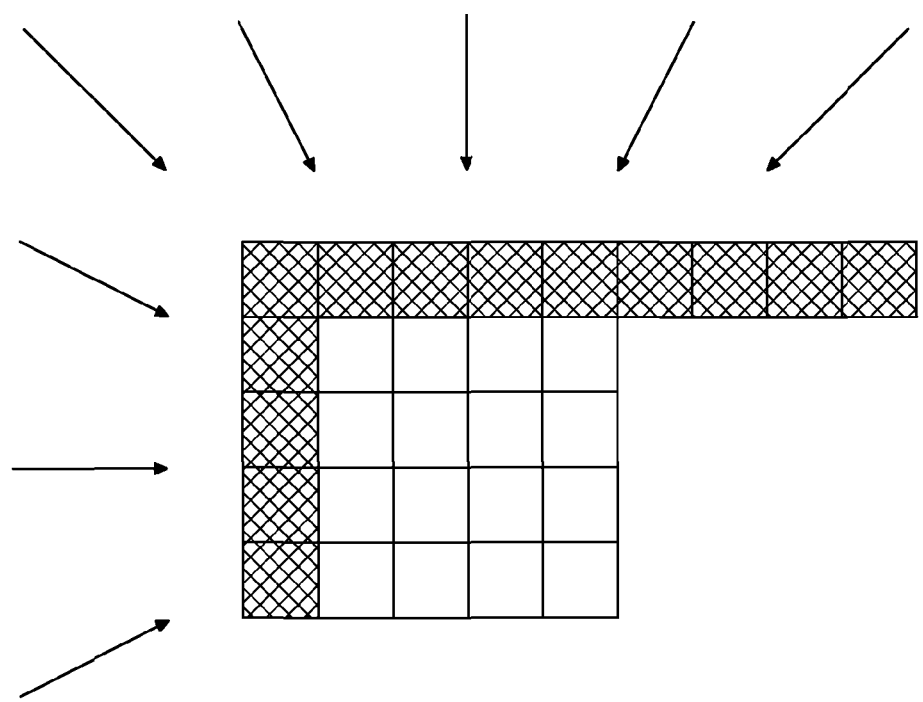
FIG. 1 is a diagram illustrating a known spatial prediction technique.

As has been mentioned MPEG Part 10/AVC/H.264 (from here referred to as H.264 for convenience) contains an addition to previous MPEG standards, which is the provision for intra prediction of blocks. Data along the top and to the left of a block, which has been decoded and reconstructed already, can be used to provide a prediction for the current block which can now be coded differentially. FIG. 1 shows the 8 possible directional predictions that can be used for 4×4 blocks (previously reconstructed samples are shaded). In addition to these directional predictions, the DC can be predicted from the mean of pixels at the edges of the block, giving 9 modes in all. Other predictions are available for 16×16 and 8×8 blocks.

The H264 intra prediction tool showed the advantage of combining spatial predictive coding with transform coding. It was particularly effective for edge detail and for strongly directional texture, such as diagonal stripes.

There is however one problem in the inherent tension between the small blocks required to produce a good prediction, and the large blocks required to get good transform coding gain.

The decrease in efficiency in spatial prediction coding with increasing block size can be understood to arise from the increasing distance (at least towards the end of a raster scanned block) between the current pixel and the pixels upon which the prediction is based. As that distance increases, correlation between pixels reduces and so also does differential coding efficiency.

Likewise, motion compensated prediction has formed an essential part of video compression standards since MPEG-1. A key issue is the trade-off between block size and prediction accuracy. Larger block sizes require fewer motion vectors to be coded, but have less prediction accuracy, since small objects or parts of objects in a large block may move differentially with respect to the rest of the block. Transform block sizes are consequentially constrained since block transforms are generally applied wholly within a prediction block, to avoid the difficulties of transforming the transitions from one block to another. In H264, these trade-offs may be achieved by selecting from among a very wide variety of motion block partitions.

Note that in some systems, such as the emerging MPEG HEVC standard, transform blocks may be strictly smaller than blocks used for a prediction: for example, a 16×16 prediction block would be split into 4 8×8 transform blocks which are coded in some order. This is only a convention as to where prediction data is signalled, since the prediction for each 8×8 sub-block can be renewed from locally decoded blocks, which may include the previously coded sub-blocks. Such a method does improve prediction but cannot refine predictions to within the 8×8 transform block size.

What would be desirable is to predict at a finer grain than the transform may allow. However, within a block, the samples available to the decoder are those that have been decoded and reconstructed. The samples used in the encoder are the original samples, which are different due to subsequent quantisation. The prediction would in this sense be open loop, in contrast to the closed loop that is provided where a local decoder within the encoder guarantees that the prediction values used by the encoder can be exactly reconstructed in the decoder. This difference could cause significant noise growth To see how the reconstruction noise can grow, let $P(x_0, \ldots, x_{r-1})$ denote the prediction of sample $x_r$ from samples $x_k$, $k=0, \ldots, r-1$. Then the prediction residues $y_r$ are given by:

$$y_r = x_r - P(x_0, \ldots, x_{r-1})$$

Let $L=T^1Q^{-1}QT$ denote the process of transforming, quantising, inverse quantising and inverse transforming the sequence $y_r$. We can assume for the moment that the effect of L is to add a noise source $n_r$ of variance $\sigma_n^2$ to $y_r$, i.e.

$$Y_r = L(y_r) = y_r + n_r$$

In reconstructing, the decoder will form $$X_r = Y_r + P(X_0, \ldots, X_{r-1})$$

In addition to the noise $n_r$ on $Y_r$, the prediction will differ because of the noise on each of the previous reconstructed values X, and this noise can therefore grow. In particular, since a good predictor P will typically have unity gain at DC, meaning that 1−P has a zero and the inverse filter will have a pole i.e. infinite gain at DC. Thus noise can grow in an unbounded fashion. A closed-loop predictor, in which the predictor uses the reconstructed values $X_O$ at the encoder also, will not have this problem.

There is thus a problem that a closed-loop predictor in conjunction with a transform encoder is limited either in the accuracy of the prediction (if the block is large) or in the efficiency of the transform (if the block is small); and an open-loop predictor can suffer from unbounded noise gain.

A solution to this problem will now be described.

Mathematically, define $P^C$ and $P^O$ to be two predictors. At the encoder $P^C$ will be applied closed-loop, to produce a prediction constructed solely from previously coded and reconstructed coefficients; $P^O$ will be applied open-loop, that is it will be applied to produce predictions from original uncoded coefficients. Of course, at the decoder both predictions must use reconstructed coefficients.

An example of $P^C$ would be to predict pixels in a block by the mean of pixels in neighbouring blocks. An example of $P^O$ would be to predict a pixel from immediately neighbouring pixels, whether they fall in the same block or not.

Then a new combined predictor P can be created by, $$P=(1-c)P^C+cP^O$$

In this case, a factor c applies to $P^O$. If this factor c is between zero and unity it acts as a damping or leakiness factor on the noise contributed by the open-loop predictor in the decoder, and this controls noise growth. Yet the combined predictor remains an excellent predictor due to the complementary contribution of the closed-loop predictor, whereas without a complementary closed-loop predictor the efficacy of the prediction would fall as the factor c got smaller. In particular, if both predictors eliminate DC, then so will the combined predictor.

Figure 2:
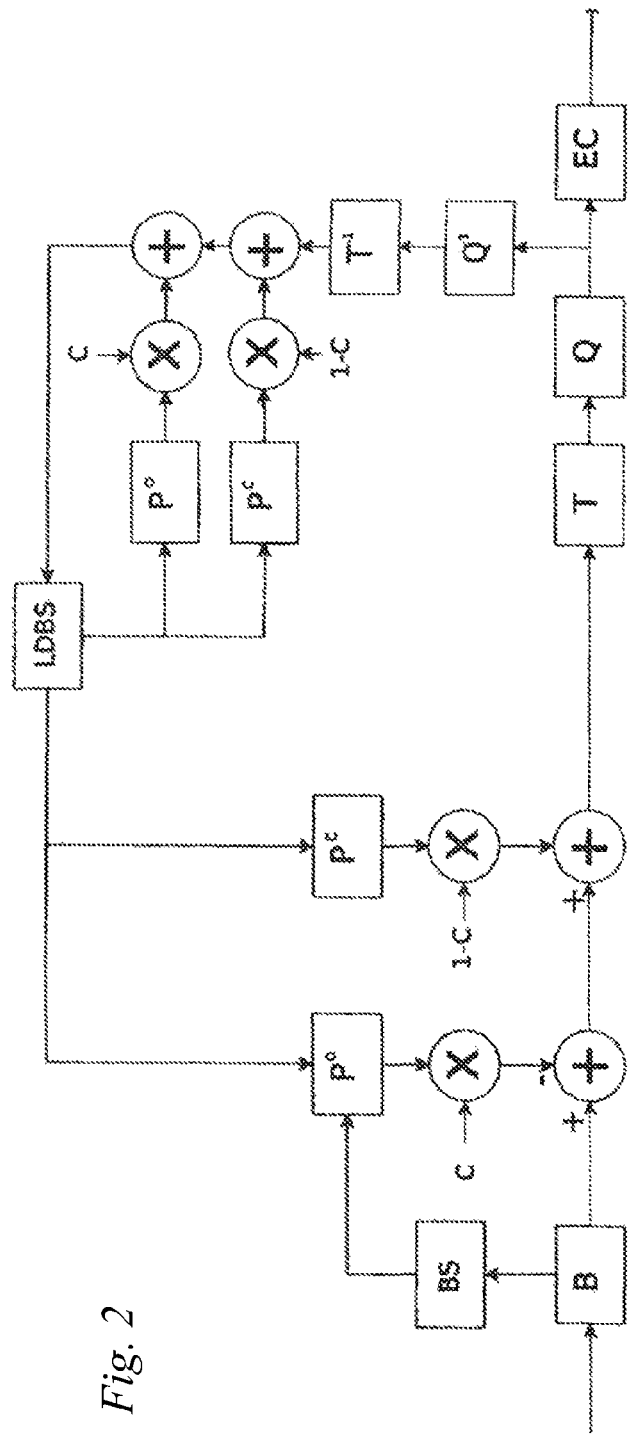
FIG. 2 is a block diagram of an encoder.

An example of an encoder architecture is shown in FIG. 2. Input video is received at block splitter B which serves to split the input data into blocks. The block information is supplied to a block store BS and to a subtractor (200). Block store BS provides data to an open loop predictor $P^O$. This predictor operates within the block to provide a prediction value for the current pixel. The predicted value takes the form, in one example, of the arithmetic mean of the three pixels, respectively: horizontally to the left, diagonally to the top left and vertically above the current pixel. It will be understood that a predicted value can be formed in a variety of other ways, utilising further or different neighbouring pixels and applying different weightings to different neighbouring pixels.

The predicted value from $P^O$ is supplied as the negative input to subtractor (200) via a multiplier (204) which applies a gain factor c. The parameter c may typically vary between zero and unity. This gain control, when c is less than unity, addresses the problem of noise growth that would otherwise be associated with the use of an open loop predictor.

The output from the subtractor (200) passes through a second subtractor (204) to a conventional DCT or other spatial transform block T. The transform T operates on the received picture difference to provide transform coefficients to a generally conventional quantiser block Q. The quantised transform coefficients undergo variable length or other entropy coding in block EC to provide the output bitstream of the encoder.

To provide the closed loop prediction, a locally decoded block store LDBS is maintained containing values that have been reconstructed just as they would be in the decoder, using only previously reconstructed data values. The closed loop spatial prediction may conveniently take the form of the known H.264 spatial predictor or motion compensated predictors.

The closed loop prediction values are passed as a negative input to subtractor via multiplier applying a gain control factor of (1−c).

Values from the LDBS are constructed by means of an inverse quantiser block $Q^{-1}$, an inverse transform block $T^{-1}$, and the addition of predictions in the same proportions but using only previously-decoded reconstructed values from the LDBS itself.

Note that in block operation, the feed-forward predictor $P^O$ can also use reconstructed samples where they are available, at the top and left of a block if we assume blocks are scanned in raster order. Thus the samples input to $P^C$ are also input to $P^O$. This means that wherever possible the predictions use reconstructed samples.

Thus the pixels in the top row and the left column of the current 4×4 block can be predicted entirely or mostly from locally decoded pixels (outside the current block) which are shown cross hatched in the figure. The result should be to restrict the growth of noise still further by synchronising the prediction in encoder and decoder each block.

Since there will be little or no divergence between encoder and decoder on the top and left of the block, a lower degree of leakiness may be required there, thus allowing for better prediction to be used in these areas. In other words, the parameter c may—in addition to any variation in accordance with picture content—may vary with the position of the current pixel in the block. This variation with pixel position need not necessarily be signalled in the bitstream; it may for example form part of an industry or de facto standard.

In this approach, the coefficient order for the prediction and difference generation will not be a raster order but will be block-by-block.

Since the total prediction now has no weighting factor, this architecture allows for varying the degree of leakiness across a block without introducing spurious frequency components.

If c is fixed, a useful value has been found to be around 0.5.

The parameter c may be optimised for different picture content depending on the block sizes used, the quantisation parameters selected and the relative success of the two predictions. Small block sizes and low levels of quantisation will in general produce less divergence between the encoder and decoder open loop predictions, and so the overall value of c could be adjusted closer to unity in these circumstances, either through encoding in the bitstream or according to the governing standard.

This system is particularly attractive since it can be combined easily with a whole range of different predictors. For example, $P^C$ could be a directional predictor already defined in H264, and $P^O$ could be a directional pixelwise predictor. Alternatively $P^C$ could be a motion compensated temporal predictor.

Or, for wavelet coding, one could do a form of hierarchical coding where the low-pass coefficients provide a closed-loop prediction at each level.

In a further variation, a fixed number of possible values of c could be pre-determined, with an encoder able to choose the best value to use for a particular block or set of blocks, or to choose only to use the closed-loop predictor. Meta-data could be sent accompanying the transform coefficients of each block or set of blocks to indicate whether an open-loop prediction has been used, and which value of c has been employed.

For example, 4 possible non-zero values of c may be used, perhaps ¼, ½, ¾ and 1. Values of 15/32, 25/32, 10/32 and 22/32 have been shown to work well. An encoder would select an optimum value to use, normally by some rate-distortion optimisation method.

A variety of strategies can be employed for generating a prediction within the current block. Key issues in developing such strategies are the efficiency of the decoder operations that result and the accuracy of the combined prediction process.

Figure 3:
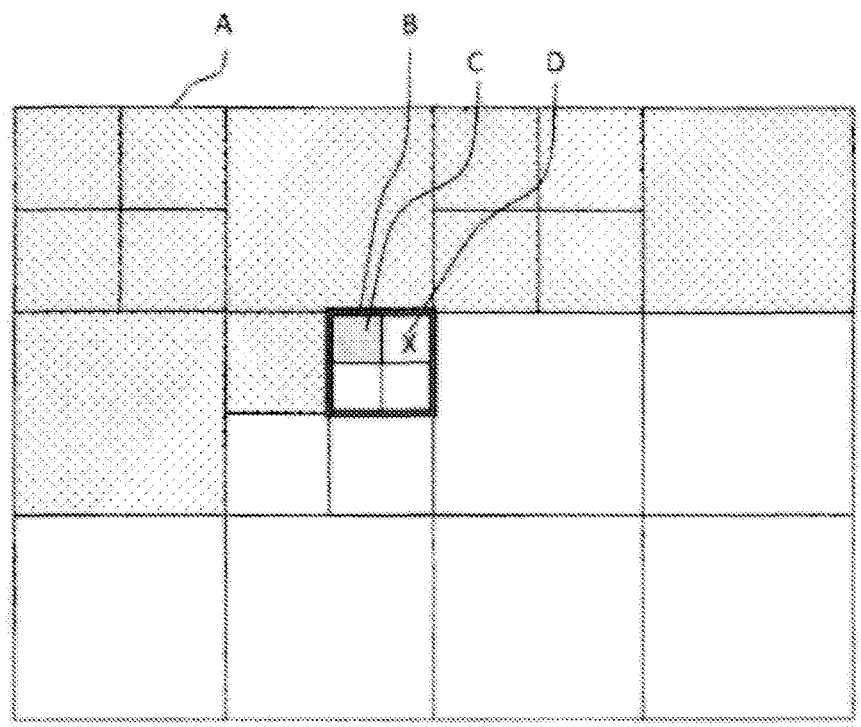

FIG. 3 shows part of a frame during encoding/decoding. Already encoded/decoded blocks (A), whose position is determined by the scanning order, are those units for which the reconstructed samples can be available at both encoder and decoder. It is helpful also to look within the block that is being processed and to divide the pixels of that block into defined subsets. In one example, shown in FIG. 3, the subsets are sub-blocks within the overall block structure. Already predicted sub-block (C) and currently processed sub-block (D) from current block (B) in this example belong to the current block (B). The units whose reconstructed samples are already available at the encoder and decoder at the moment of current block processing can be used for closed-loop prediction. Since sub-block C remains within the overall transform block B, its samples may not be used for closed-loop prediction.

Figure 4:
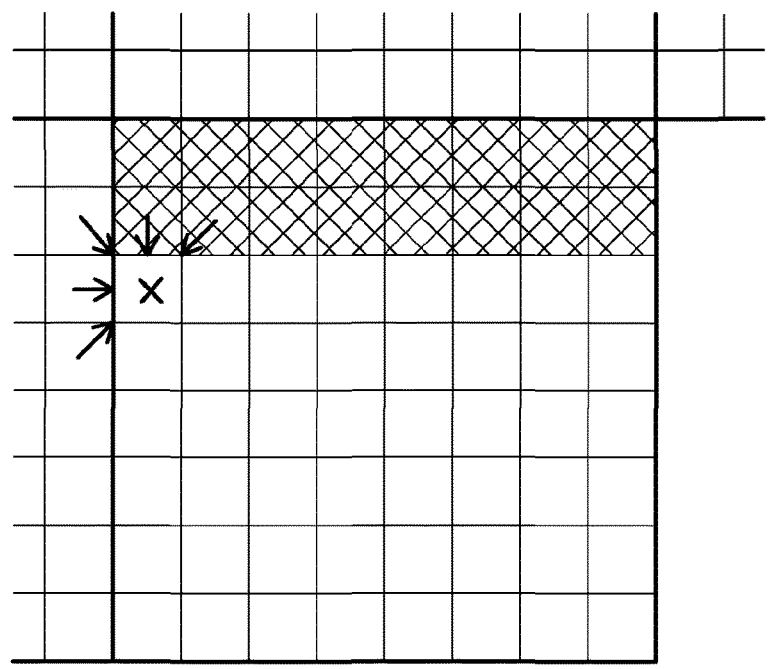

A possible strategy for open-loop prediction from neighbouring pixels or samples (either from current or previous blocks or sub-blocks) is indicated with arrows in FIG. 4. In this example a raster scan of samples within the sub-block is assumed, which makes the top and top right samples of the current sub-block available for prediction of the current sample (X). However, such a method incurs inefficiency in a decoder since it requires the reconstruction of pixels in series, since each depends upon the previous values in raster order. (In an encoder no such constraint is imposed, since original values may be used for open-loop prediction, all of which are available to the encoder).

Figures 5, 6, 7:
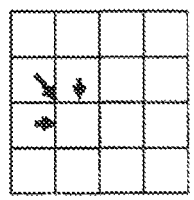

It is important to note that in the presence of systems that enable parallel computing, parallel computation of values of $P^O$ is highly advantageous. Approaches for parallel processing of pixels in a block will highly depend on the prediction template used. The prediction template is one of the components that define which neighbouring samples can be used in prediction. For a template example in FIG. 5, the left, top and top-left samples can be used in prediction. The scanning order of coefficients can in that case be arranged in different ways and two examples related to different scanning strategies are depicted in FIG. 6 and FIG. 7 for an 8×8 block. Numbers in those figures represent time instances in which the predictions in corresponding pixel positions can be computed. While the example in FIG. 6 suggest a simple raster scan, the resulting predictions obtained using the strategy presented in FIG. 7 are identical to those in FIG. 6. The example in FIG. 7 shows the potential of parallel processing, with arrows suggesting possible scanning strategy. While the example in FIG. 6 requires 64 time instances for computation of predictions for all samples, the time required for the example in FIG. 7 is 15 (N·2+1, where N=8), if parallel processing is available. This can lead to highly significant efficiencies in processing.

Figures 8, 9:
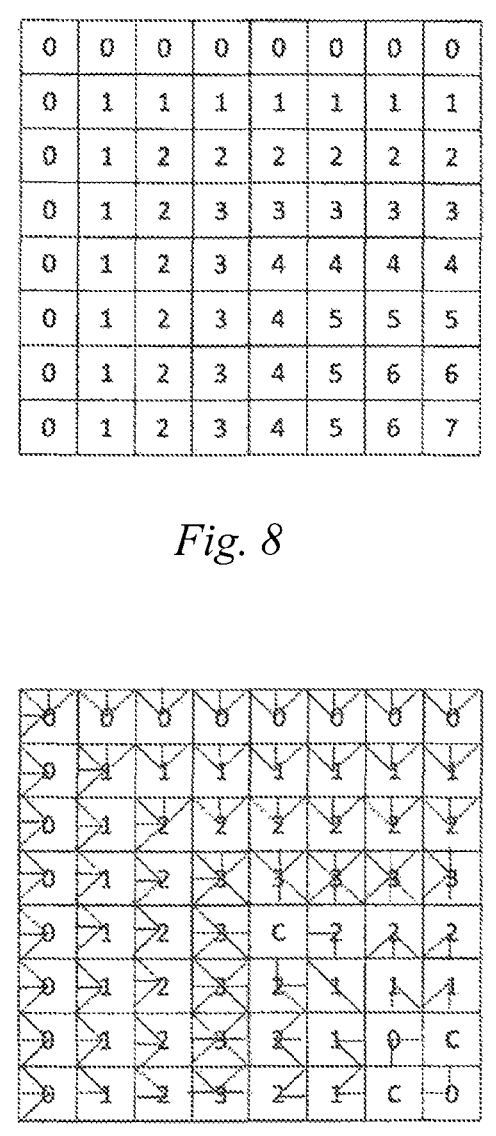

Another approach for enhancing parallelisable prediction can be achieved with adaptive templates, which can be built based on different principles, e.g. on taking into account the number of available samples. FIG. 8 shows the example where predictions can be computed from at least two available neighbouring samples. In this way, the processing time for an N×N block falls to N time instances.

Further parallelisation and consequential increases in processing efficiency can be achieved with alternative prediction structures in which some samples in the block are only predicted from locally decoded neighbouring blocks, which means that those samples can be used for further (open-loop) predictions immediately. FIG. 9 shows an example in which 3 samples from the block (anchor pixels, marked with "C") are predicted only using locally-decoded data which then provides a way for multiple scans which can in only 4 steps (0 to 3) predict all samples in an 8×8 block with adaptive templates defined by the availability of at least 2 neighbouring samples. Lines within each sample indicate neighbouring samples from which their values can be predicted. While anchor pixels can be predicted in closed-loop fashion, they can also be available in different ways, e.g. their original or quantised values can be transmitted in the bitstream, either by means of the transform coefficients or as additional metadata Using the terminology introduced above, the combination of closed and open loop predictions is extended to the case where both closed and open loop predictions are made within the block currently being processed.

The scheme which uses anchor pixels, as depicted with an example from FIG. 9, provides both advance parallelisation opportunities, as well as a flexible base for new prediction strategies. The anchor pixels in this scheme can be arbitrary placed within the unit, as long as their position is known for both the encoder and the decoder. For example, the positions can be defined for specific modes, can be signalled in the bitstream, or recovered at the decoder from other available data.

Figure 10:
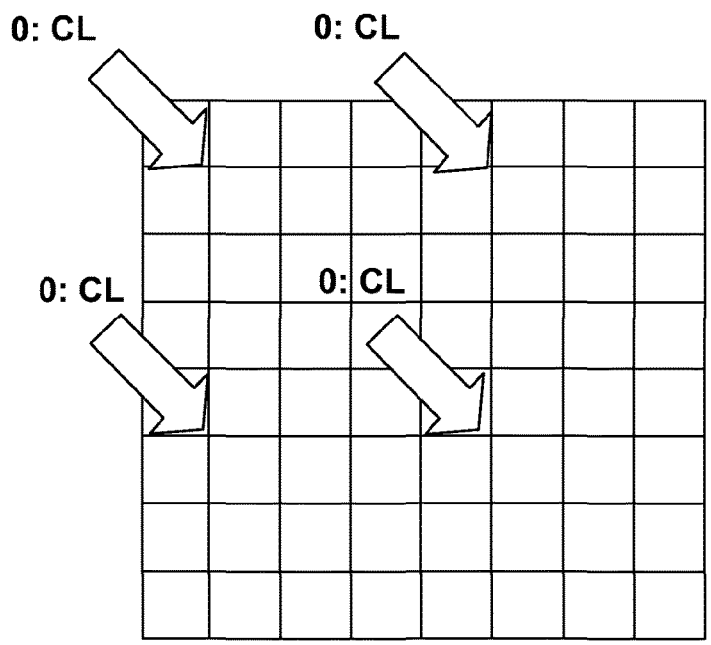
Figure 11:
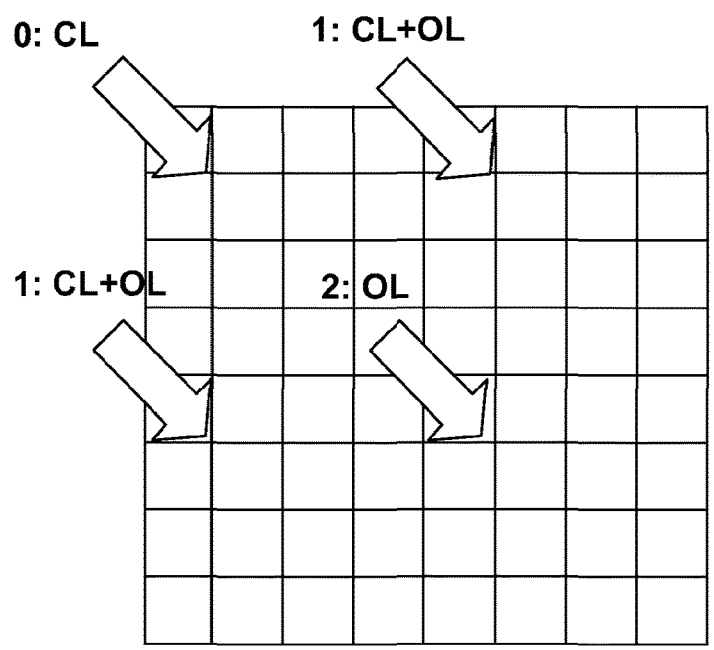

In the following text generalised prediction strategies will be described for a block that consists of four sub-blocks. Prediction is traditionally performed in a closed-loop fashion so that predictions for all sub-blocks are actually performed from the neighbouring blocks. This is demonstrated in FIG. 10 where four sub-blocks are directionally predicted in a closed-loop (CL) fashion. "0" indicates that prediction for all samples in the block (regardless to which sub-block they belong) be computed at the same time instance. This type of prediction can be further extended to a combined open- and closed-loop prediction. For example in FIG. 11, the top-left sub-block of the current block can be first predicted using closed-loop prediction from already decoded blocks. Depending on the chosen direction, i.e. prediction strategy, top-right sub-block and left-bottom sub-block can be predicted at the same time instance "1" from both neighbouring blocks as well as from already decoded top-left sub-block. Finally, the remaining sub-block can be predicted from at time instance "2" from the sub-blocks from the same block.

Blocks on the actual borders of the frame (or other "hard" borders such as those of slices where no information outside that slice is available to the encoder) cannot be treated in the same manner as blocks that are surrounded by neighbours. Current practice is to replace prediction from unavailable pixels with a prediction from a suitable value (DC value) that is used for the whole block. That value may be suboptimal for prediction. Accordingly, an alternative strategy is here proposed.

Figure 12:
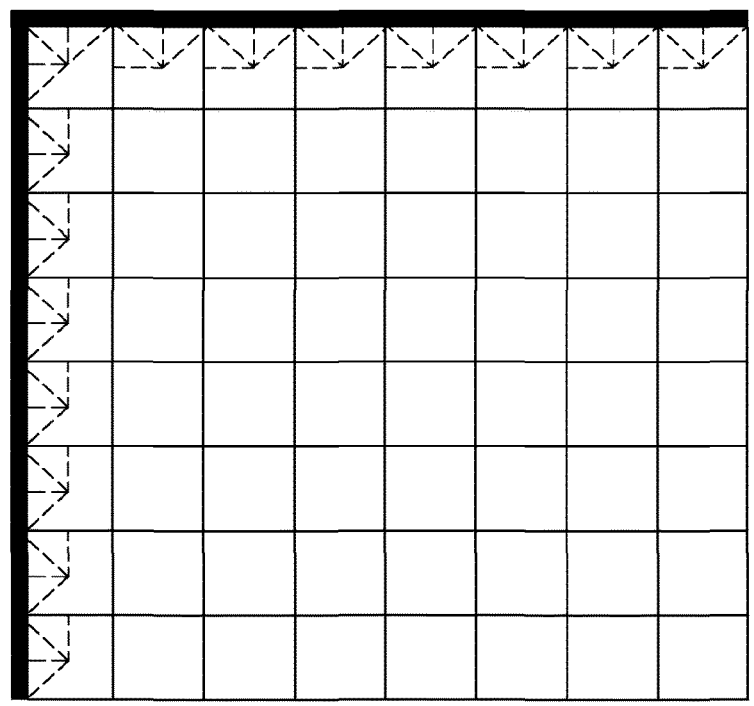

In FIG. 12 a top-left block of a frame is depicted. Possible prediction directions for border pixels (as if there were in some other block where all neighbouring blocks are available for prediction) are presented with dotted and full lines. However, the prediction directions marked with dotted lines are not available for those pixels in this block. (Note that prediction directions for inner pixels are not included here for simplified representation). A prediction template for a given pixel can be changed and only the pixels available for prediction can be used, avoiding possibly negative contribution of the DC value. Thus, each pixel in the top row of the sub-block may be predicted from its left-hand neighbour (with the exception of the top left pixel for which a DC value is still used). The choice of prediction from available pixels only or prediction using the traditional approach (using DC value where required) can be optional, i.e. adaptive, and signalled in the bitstream for each block or sub-block.

Figure 13:
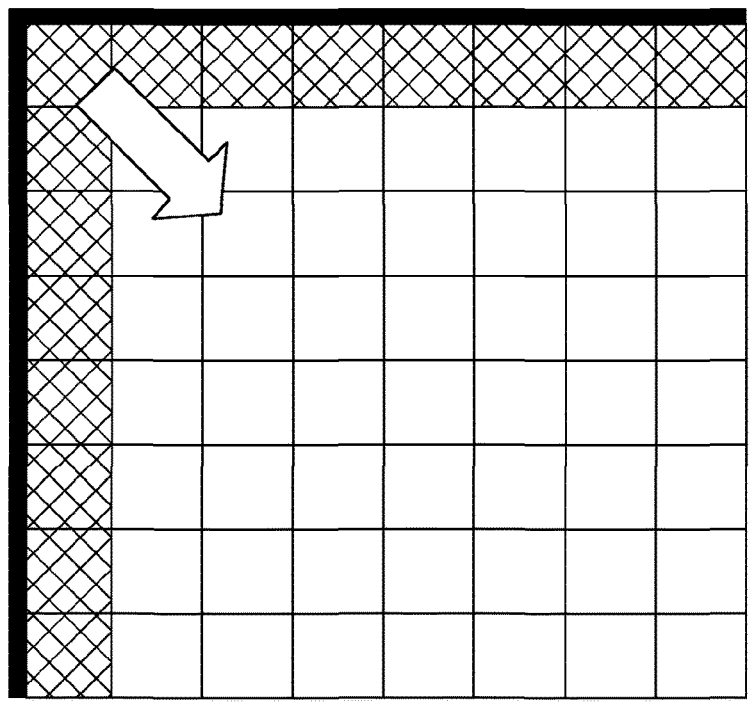
Figure 14:
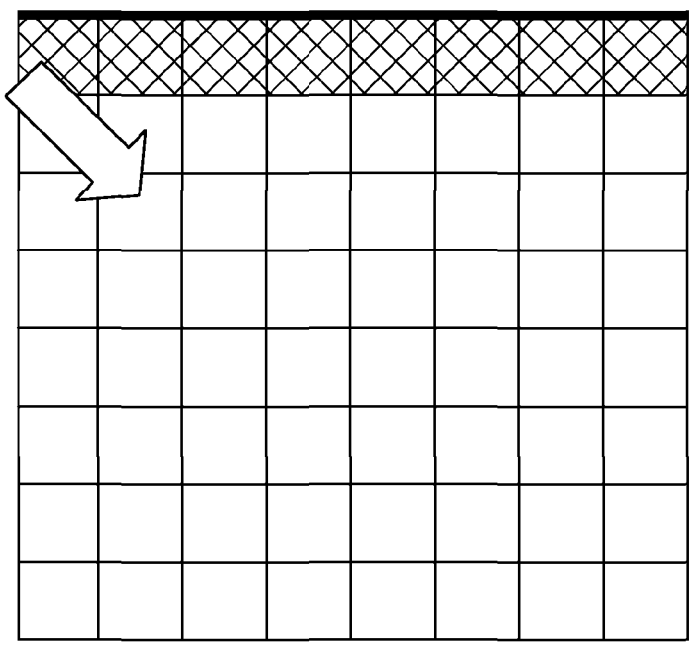

In addition to removing possible poor prediction using DC values, further alternative prediction strategies can be applied for the pixels from blocks on borders. Once the border pixels are predicted, they can be used for prediction of inner pixels of a given block or sub-block. That prediction does not have to be pixel by pixel, but can be one of traditional prediction strategies (e.g. directional, angular, etc.). The difference is that in this case in uses pixels from the current block (shaded pixels from FIG. 13), or a combination of the pixels from the current block or sub-block and pixels from neighbouring block or sub-block (as represented in FIG. 14 where shaded pixels are from the current block or sub-block, and the pixels from neighbouring blocks or sub-blocks are not depicted here). In FIGS. 13 and 14 the thick line represents the border (with of course no pixels available for prediction across the border).

The arrangements described above are only examples of useful subsets of pixels or samples in the block being processed. In that block, all predictions taken from outside the block are available simultaneously to the decoder, without restriction. Predictions taken within the block are restricted and need to be handled in series with the pixel upon which the prediction is based being reconstructed before any pixel is predicted from that re-constructed pixel.

It will in certain applications be useful to define a row or a column of a block as a subset of the block, with pixels or samples in each subset being processed simultaneously and with respective subsets processed in parallel. A chessboard arrangement is also contemplated, with the "white squares" as one subset and the "black squares" another.

The prediction strategies that combine open- and closed-lop prediction can be fixed for a given coding profile. For example, on all blocks of a certain size, open-loop can be used with the combination of closed-loop prediction, while on all other blocks only the closed-loop prediction can be used. Such a strategy requires no meta-data for those blocks. On the other hand, meta-data for configuring the prediction methods for an individual block or a set of blocks may be encoded by well-known methods for encoding configurable options in existing video standards. For example, an encoder may first encode a flag indicating the presence or absence of an open-loop predictor. If an open-loop predictor is present, the option selected could be encoded in a number of bits. A typical scheme would allow 2" options, encoded in N bits, as in the following pseudocode for case N=2:

```
EncodeBit(using_open_loop);
if (1==using_open_loop){
   EncodeBit(combined_pred_mode & 0x01);
   EncodeBit((combined_pred_mode & 0x02)>>1);
}
```

Alternatively, there may be some correlation between the metadata of one block and that of previously coded blocks. In that case an encoder may follow a scheme similar to that used for coding intra prediction modes in H.264. It may consider the case where the open loop in not used as an additional prediction mode, making $2^N+1$ options. A flag is then coded indicating whether the prediction is used. If it is not, then the remaining $2^N$ modes can be coded using N bits as illustrated in the following pseudocode for case N=2:

```
predicted_mode = get_mode_prediction( );
EncodeBit(combined_pred_mode==predicted_mode);
if (combined_pred_mode<predicted_mode){
   EncodeBit(combined_pred_mode & 0x01);
   EncodeBit((combined_pred_mode & 0x02)>>1);
}
else if (combined_pred_mode>predicted_mode){
   combined_pred_mode = combined_pred_mode-1;
   EncodeBit(combined_pred_mode & 0x01);
   EncodeBit((combined_pred_mode & 0x02)>>1);
}
```

Figure 15:
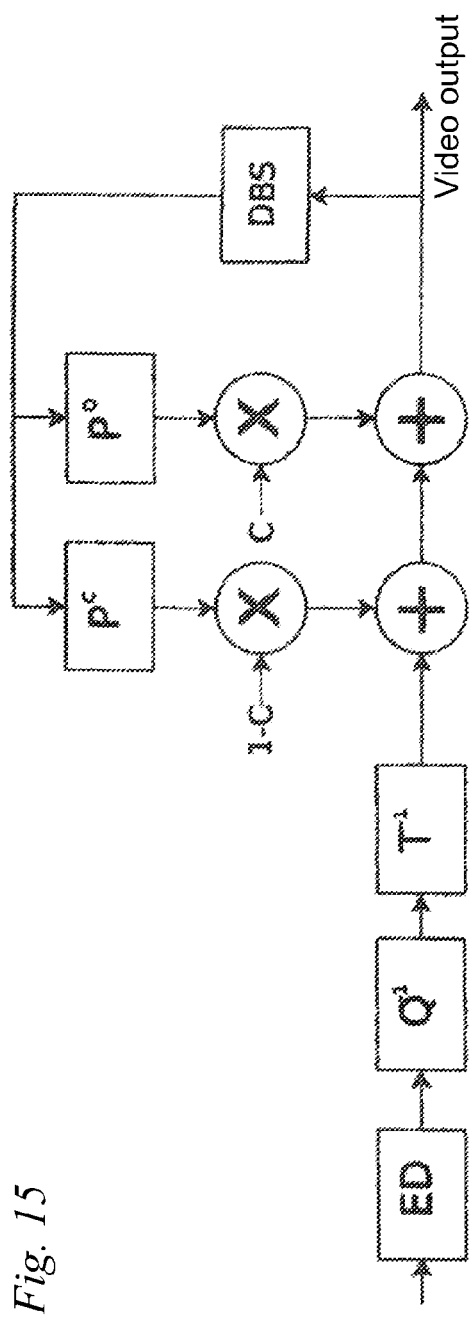
FIG. 15 is a block diagram of an encoder.

A decoder architecture is shown in FIG. 15. In the decoder, the bitstream is received by an entropy decoding block ED and passes through an inverse quantiser block $Q^{-1}$ and an inverse transform block $T^{-1}$. The output of the inverse transform block is passed to the input of a decoded block store DBS. Decoded data from the decoded block store is passed to the inputs of a closed loop predictor $P^C$ and an open loop protector $P^O$. The output of $P^O$ is passed to an adder (402) through a multiplier (404) applying a gain control factor c. The output of predictor $P^C$ is applied to an adder (406) through a multiplier (408) applying gain control factor (1−c). Both the open-loop predictor $P^O$ and the gain control factor c may be selectable based on meta-data transmitted by the encoder. The two adders serve to add the weighted prediction outputs to the values output from the inverse transform block. Once reconstructed, the values are passed into the DBS for use in predicting subsequent values.

The input to the DBS of course also provides the video output from the decoder.

Optimum predictors can be selected of by adaptive means. Predictors may be chosen, for example, by linear optimisation techniques, minimising mean square error, or by determining and extrapolating local gradients. Whatever the method, a fundamental distinction is between continuous adaptive techniques, whereby the choice of predictor is a continuous function of values in a neighbourhood of the current pixel, and discontinuous techniques in which the predictor is switched.

Operating open-loop, in any adaptive technique the adaptive predictor itself could differ between encoder and decoder. Discontinuous adaptive techniques would appear especially dangerous, since very different predictors could be chosen. In a continuous system, given similar values, similar predictors would be chosen.

As an example of continuous adaption, it can be shown that if pixels are scanned to produce a sequence x(n) with autocorrelation R(k), then the MMSE predictor $$P(x, n) = \sum_{k=1}^{N} a_r x(n - r)$$

has coefficients $a_k$ which satisfy the system of TV linear equations $$R(j) - \sum_{k=1}^{N} a_k R(j-k), \; j = 1, \ldots, N$$

Therefore an adaptive system can be obtained by taking a rolling snapshot of the signal and solving this system. A more tractable adaption method which would approximate this (and converge to it, given stationary statistics) would be to use the LMS or RLS algorithms.

In this case both the basic samples and the autocorrelation functions would be different between encoder and decoder, causing different filters to be used. This might well not be significant, however, if the prediction could be much better. The adaption could be made more stable by assuming a degree of white noise, for example by adding a small delta impulse to the measured autocorrelation R(k), or by directly adding artificial noise to the feedback signal in the LMS/RLS algorithm.

The architectures described above involve predictions using the original, uncoded samples. It is this that causes the noise addition from the prediction process. However, in a compression system an encoder is able to use any samples it likes to generate a bit stream: it is only decoder processes that need to be specified. So the encoder may modify the samples used for prediction in order that they are closer to the samples that the decoder uses for reconstruction. With open-loop predictors, it cannot be guaranteed that the samples are identical, but multiple passes should provide some degree of convergence.

Figure 16:
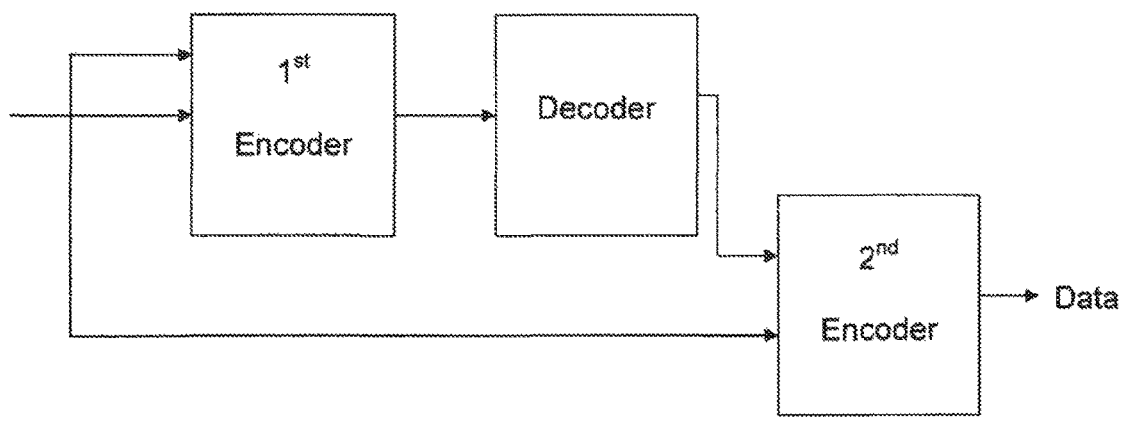
FIGS. 16 and 17 are block diagrams illustrating multi-pass encoding techniques.
Figure 17:
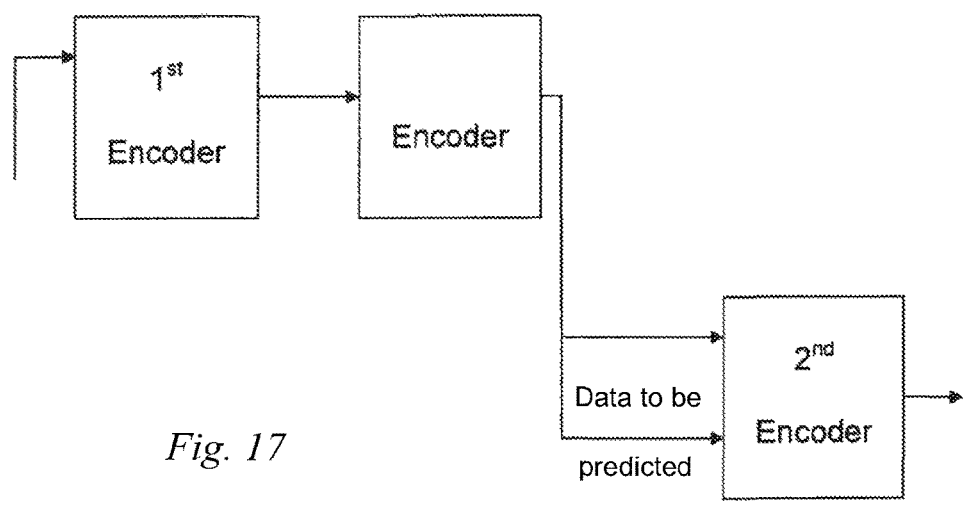

The way to do this is to concatenate two (or more) encoders, so that the prediction utilises data that has been coded and locally decoded by a first encoder. In this case an element of feedback has been reintroduced into the encoding process. Block diagram are shown in FIGS. 16 and 17. Here a first encoder performs the initial coding in the manner described above. A decoder again as described above then produces a first-pass decoded signal, which is then passed to the second encoder. Of course, whilst the first and second encoders are drawn separately, they will typically constitute first and second passes of one hardware or software encoder.

Two basic variants may be considered. In the first, shown in FIG. 16, only the predictor of the second encoder uses the locally decoded version, but the pixels being predicted remain the original ones (with a compensating delay to account for the first-pass encode and decode). In the second, shown in FIG. 17, both prediction and predicted pixels would use a locally decoded version. Any number of these stages may be concatenated in order to achieve greater convergence between encoder and decoder prediction coding processes.

It will be understood that this invention has been described only by way of example and that a wide variety of modifications are possible without departing from the scope of the appended claims. To the extent that described examples include separate features and options, all practicable combinations of such features and options are to be regarded as disclosed herein. Specifically, the subject matter of any one of the claims appended hereto is to be regarded as disclosed in combination with the subject matter of every other claim.

The invention claimed is:

1. A video compression encoder comprising:
    a block splitter for receiving picture information and splitting the picture information into spatial blocks of r picture elements;
    a predictor for providing prediction values for the block;
    a subtractor for receiving picture information and prediction values and forming r difference values;
    a block transform for conducting a transform on the block difference values to provide r transform coefficients;
    wherein the predictor operates upon subsets of picture elements in the block on which said block transform is configured to conduct said transform, there being at least a first and a second subset of picture elements within the block on which said block transform is configured to conduct said transform;
    wherein each subset comprises a plurality of picture elements;
    wherein the first subset of picture elements comprises those picture elements which are predicted wholly from previously coded and reconstructed blocks; and
    wherein the second subset of picture elements comprises picture elements which are predicted at least in part from picture elements of the first subset.

2. An encoder according to claim 1, wherein the first subset of picture elements comprises at least one picture element which is not contiguous with any previously processed block.

3. An encoder according to claim 2, wherein the location or value of such a picture element which is not contiguous with any previously processed block is signalled to a decoder.

4. An encoder according to claim 1 wherein the predictor is, for those picture elements which are predicted wholly from previously coded and reconstructed blocks, a directional predictor.

5. An encoder according to claim 1, wherein the predictor is, for those picture elements which are predicted wholly from previously coded and reconstructed blocks, a motion-compensated predictor.

6. An encoder according to claim 1, wherein the predictor operates sequentially on a series of subsets $S_i$ and in parallel upon the picture elements of each subset, the prediction for picture elements in subset $S_i$ depending at least in part upon the picture elements in preceding subsets $S_0, \ldots, S_{i-1}$.

7. An encoder according to claim 1, wherein the predictor comprises an open loop predictor generating predictions based at least partly on picture elements in the current block and a closed loop predictor generating predictions based only on picture element information from a local decoder.

8. An encoder according to claim 7, wherein the prediction values comprise a weighted sum of the open loop prediction values and the closed loop prediction values.

9. An encoder according to claim 7, wherein said closed loop predictor generates predictions for a first subset of picture elements based on picture element information from a local decoder; and generates predictions for a second subset of picture elements and optionally subsequent subsets of picture elements based at least partly on picture elements in the current block.

10. An encoder according to claim 7, wherein the closed loop predictor has a selectable direction and wherein the open loop predictor is selected in accordance with the selected direction of the closed loop predictor.

11. A non-transitory computer program product comprising instructions causing programmable apparatus to implement a method of compression coding, the method comprising the steps of forming a block of r differences between input picture values and picture prediction values; and transforming at least some of said blocks of r differences in a block based transform to provide a block of r transform coefficients; wherein the step of forming a block of r differences on which said transforming step can operate comprises a first step conducted upon a first subset of picture elements in a block of r picture values; a second step conducted upon a second subset of picture elements in said block of r picture values and optional further steps;

wherein each subset comprises a plurality of picture elements;

wherein the first step uses picture prediction values based wholly on previously processed blocks; and wherein the second subset of picture elements comprises picture elements which are predicted at least in part from picture elements of the first subset.

12. A computer program product according to claim 11, wherein the first subset of picture elements comprises at least one picture element which is not contiguous with any previously processed block.

13. A computer program product according to claim 11, wherein the step of forming differences for a block comprises a series of steps conducted sequentially on a series of respective subsets $S_i$, and in parallel upon the picture elements of each subset, the prediction values for picture elements in subset $S_i$ depending at least in part upon the picture elements in preceding subsets $S_0, \ldots, S_{i-1}$.

14. A computer program product according to claim 11, wherein the first step uses a first predictor for those picture elements which are contiguous with previously processed blocks and a second predictor on at least one picture element which is not contiguous with previously processed blocks.

15. A computer program product according to claim 11, wherein the arrangement of the first and second subsets is selected from the group of arrangements consisting of: the first and second subsets take a chess board configuration; the first and second subsets comprise respective rows; the first and second subsets comprise respective columns; the first and second subsets comprise respective diagonals and the first and second subsets comprise respective L shapes.

16. A computer program product according to claim 11, wherein each step is conducted using SIMD, MMX or other intrinsic parallel operations available within a CPU processor.

17. A video compression decoder comprising:

an input for receiving a compression encoded bitstream organised in blocks of r values and representing at least some transform coefficient;

an inverse quantisation unit operating on said for providing re-scaling;

an inverse block transform operating on said transform coefficient blocks of r transform coefficients for conducting an inverse spatial transform on the transform coefficients;

wherein a block of r re-scaled picture differences is provided; and a predictor operating to provide prediction values for summation with said picture differences, wherein the predictor operates upon subsets of r picture elements in each of said blocks, there being at least two subsets of picture elements in the block;

wherein each subset comprises a plurality of picture elements;

wherein a first subset of picture elements comprises those picture elements which are predicted wholly from previously predicted blocks; and wherein a second subset of picture elements comprises picture elements which are predicted at least in part from picture elements of the first subset.

18. A decoder according to claim 17, wherein the predictor operates sequentially on a series of subsets $S_i$ and in parallel upon the picture elements of each subset, the prediction for picture elements in subset $S_i$ depending at least in part upon the picture elements in preceding subsets $S_0, \ldots, S_{i-1}$.

19. A decoder according to claim 17, wherein the predictor operates sequentially on a series of subsets $S_i$ and in parallel upon the picture elements of each subset, the prediction for picture elements in subset $S_i$ depending at least in part upon the picture elements in preceding subsets $S_0, \ldots, S_{i-1}$.

20. A method of compression decoding comprising the steps of:

receiving a compression encoded bitstream organised in transform blocks of r picture differences;

inverse quantising; and providing prediction values through a predictor which operates upon subsets of picture differences in the transform block, there being at least two subsets of picture elements in the block;

wherein each subset comprises a plurality of picture elements;

wherein a first subset of picture elements comprises those picture elements which are predicted wholly from previously predicted blocks; and wherein a second subset of picture elements comprises picture elements which are predicted at least in part from picture elements of the first subset.

21. A method according to claim 20, wherein the first subset of picture elements comprises at least one picture element which is not contiguous with any previously processed block.

22. A method according to claim 20, wherein the predictor operates sequentially on a series of subsets $S_i$ and in parallel upon the picture elements of each subset, the prediction for picture elements in subset $S_i$ depending at least in part upon the picture elements in preceding subsets $S_0, \ldots, S_{i-1}$.

23. A decoder according to claim 17, wherein the predictor comprises an open loop predictor generating predictions based at least partly on picture elements in the current block and a closed loop predictor generating predictions based only on picture element information from a local decoder.

24. A decoder according to claim 23, wherein the prediction values comprise a weighted sum of the open loop prediction values and the closed loop prediction values.

25. A decoder according to claim 23, wherein said closed loop predictor generates predictions for a first subset of picture elements based on picture element information from a local decoder; and generates predictions for a second subset of picture elements and optionally subsequent subsets of picture elements based at least partly on picture elements in the current block.

26. A decoder according to claim 23, wherein the closed loop predictor has a selectable direction and wherein the open loop predictor is selected in accordance with the selected direction of the closed loop predictor.

27. An encoder according to claim 8, wherein said closed loop predictor generates predictions for a first subset of picture elements based on picture element information from a local decoder; and generates predictions for a second subset of picture elements and optionally subsequent subsets of pictures elements based at least partly on picture elements in the current block.

28. An encoder according to claim 1, wherein the arrangement of the first and second subsets is selected from the group of arrangements consisting of: the first and second subsets take a chess board configuration; the first and second subsets comprise respective rows; the first and second subsets comprise respective columns; the first and second subsets comprise respective diagonals and the first and second subsets comprise respective L shapes.

29. A decoder according to claim 17, wherein the arrangement of the first and second subsets is selected from the group of arrangements consisting of: the first and second subsets take a chess board configuration; the first and second subsets comprise respective rows; the first and second subsets comprise respective columns; the first and second subsets comprise respective diagonals and the first and second subsets comprise respective L shapes.

30. A method of decoding according to claim 20, wherein the arrangement of the first and second subsets is selected from the group of arrangements consisting of: the first and second subsets take a chess board configuration; the first and second subsets comprise respective rows; the first and second subsets comprise respective columns; the first and second subsets comprise respective diagonals and the first and second subsets comprise respective L shapes.

* * * * *